United States Patent [19]
Zeiger
[11] 3,710,141
[45] Jan. 9, 1973

[54] SAMPLE AND HOLD CIRCUIT

[75] Inventor: Kenneth K. Zeiger, Levittown, Pa.
[73] Assignee: Inter-Computer Electronics, Inc., Lansdale, Pa.

[22] Filed: July 23, 1971
[21] Appl. No.: 165,645

[52] U.S. Cl. ..................307/235, 307/257, 328/151, 307/240
[51] Int. Cl. ..............................................H03k 17/00
[58] Field of Search .......328/151; 307/235, 257, 300

[56] References Cited

UNITED STATES PATENTS

| | | | |
|---|---|---|---|
| 3,333,110 | 7/1967 | Schanne | 307/257 |
| 3,484,689 | 12/1969 | Kerns | 328/151 X |
| 3,512,693 | 5/1970 | McCutcheon et al. | 328/151 X |
| 3,105,159 | 9/1963 | Ditkofsky | 307/300 X |

*Primary Examiner*—Herman Karl Saalbach
*Assistant Examiner*—B. P. Davis
*Attorney*—Jacob Trachtman

[57] ABSTRACT

A circuit for sampling a waveform voltage during a predetermined small sample time period and then holding the sampled voltage for a long hold period relative to the sample period. A waveform signal is impressed at the input of a diode bridge. A storage or hold capacitor is connected at the output of the bridge. A zener diode having a zener or breakover voltage greater than the voltage of the waveform, prevents current flow through the bridge during the hold period. The leading edge of a trigger pulse forward biases the bridge and overcomes the zener voltage, to enable the storage capacitor to reach a voltage level equal to the instantaneous voltage appearing at the bridge input. The trailing edge of the pulse turns "off" the bridge, and the zener voltage of the zener diode holds the bridge "off" until the next trigger pulse.

23 Claims, 3 Drawing Figures

INVENTOR
KENNETH K. ZEIGER
BY
Robert L. Slater, Jr.
ATTORNEYS

INVENTOR
KENNETH K. ZEIGER

BY
Robert L. Slater, Jr.
ATTORNEYS

SAMPLE AND HOLD CIRCUIT

BACKGROUND OF THE INVENTION

The invention relates generally to a circuit for sampling a rapidly varying voltage and holding the sampled voltage for a predetermined time period, and more particularly relates to a sample and hold circuit for an analog-to-digital converter.

In many analog-to-digital (A/D) converters, the analog signal may vary during the conversion period and cause errors in the conversion to the digital signals. The amount of uncertainty about the exact time when the analog signal was at the value represented by the digital signal at the input to the A/D converter is referred to as "aperture time." Generally, the aperture time is equal to the signal conversion time. The aperture time may be reduced by use of a sample and hold circuit at the input to the A/D converter.

An example of a prior used sample and hold circuit for an A/D converter included a storage capacitor to store a sampled voltage of a waveform signal for a prescribed period of time. At the start of the A/D conversion, the storage capacitor was discharged by delivering a negative pulse to the capacitor via a diode. A flip-flop was then triggered to impress a positive voltage pulse at the output of a low output impedance amplifier which enabled the capacitor to charge through another diode to a voltage level equal to an input analog voltage. When the storage capacitor finally charged to the voltage level of the analog signal, a voltage comparator would switch from one state to another to cause the flip-flop to reset. Both of the aforesaid diodes then became back-biased to prevent discharge of the storage capacitor, and the storage capacitor held the sampled voltage until the negative discharge pulse was again generated.

Although the prior sample and hold circuits reduced the aperture time, they nevertheless were limited in their capability to process high frequency signals and signals of narrow bandwidth. In the aforedescribed prior sample and hold circuit, for example, it was required to fully discharge the hold capacitor before charging it to the voltage level of the analog signal. In the subject invention, on the other hand, the sample period is appreciably reduced, since the hold capacitor is either charged or discharged to reach the voltage level of an input waveform or analog signal. Furthermore, in the previously used sample and hold circuits, the duration of the sample and hold period could not be precisely controlled. This was due primarily to the jitter and pulse width and amplitude variations in the trigger pulses starting and ending the sample period.

SUMMARY OF THE INVENTION

The sample and hold circuit of this invention includes means for sampling a voltage of a waveform signal during a predetermined short time period and holding the voltage for a long period relative to the sampling period. A balanced diode bridge is connected between an input of a waveform signal and a hold capacitor. A zener diode having a zener voltage greater than the voltage of the waveform is connected in the current pathway of the bridge. A trigger means generates a trigger pulse to bias the bridge "on" and overcome the zener voltage of the zener diode on the leading edge of the pulse. Current then flows through the bridge to charge the hold capacitor to the voltage of the waveform appearing at that instant at the input to the bridge. The trailing edge of the trigger pulse turns the bridge "off," and the zener voltage of the zener diode maintains the bridge "off" until the next trigger pulse.

An inverter means is coupled to the input and to the output of the bridge. Variations of the waveform signal are received at the inverter input and in response thereto, inverted signals are generated at the inverter output. The inverted signals cancel leakage signals coupling through the bridge via the capacitance between the input and output of the bridge when the bridge is "off."

The trigger means includes a mesa transistor which is fired into the avalanche mode. The output of the transistor is connected to an unterminated delay line. The energy reflected back from the delay line turns the transistor "off." The length of the delay line primarily determines the width of the pulse. A transformer is coupled to the delay line on the primary side, and coupled to the bridge on the secondary side. The transformer transfers the trigger pulse to the bridge.

Accordingly, it is a primary object of this invention to provide a circuit for sampling a waveform signal during a short time period and holding the sampled voltage for a long period relative to the sample period.

Another object is to provide a trigger pulse having a sharp leading edge for biasing a diode bridge "on" and a trailing edge for biasing the bridge "off."

Another object is to connect a zener diode having a zener voltage greater than the waveform signal in the current pathway of a diode bridge, whereby a trigger pulse for biasing the bridge "on" overcomes the zener voltage of the zener diode to permit current conduction through the bridge.

Another object is to provide a transistor means driven into the avalanche mode and cooperating with an unterminated delay line, for generating a trigger pulse having minimal jitter and no appreciable pulse width variation from one pulse to another.

Still another object is to hold the sampled voltage at substantially the same voltage level for a long period of time relative to the sampled period.

Still another object is to provide means for stabilizing the amplitude of a pulse which generates a trigger pulse used for biasing the diode bridge "on."

Still another object is to use an unterminated delay line to control the pulse width of the trigger pulse.

BRIEF DESCRIPTION OF THE DRAWINGS

Referring to the drawings in which the same characters of reference are employed to indicate corresponding similar parts throughout the several figures of the drawings.

Figure 3:
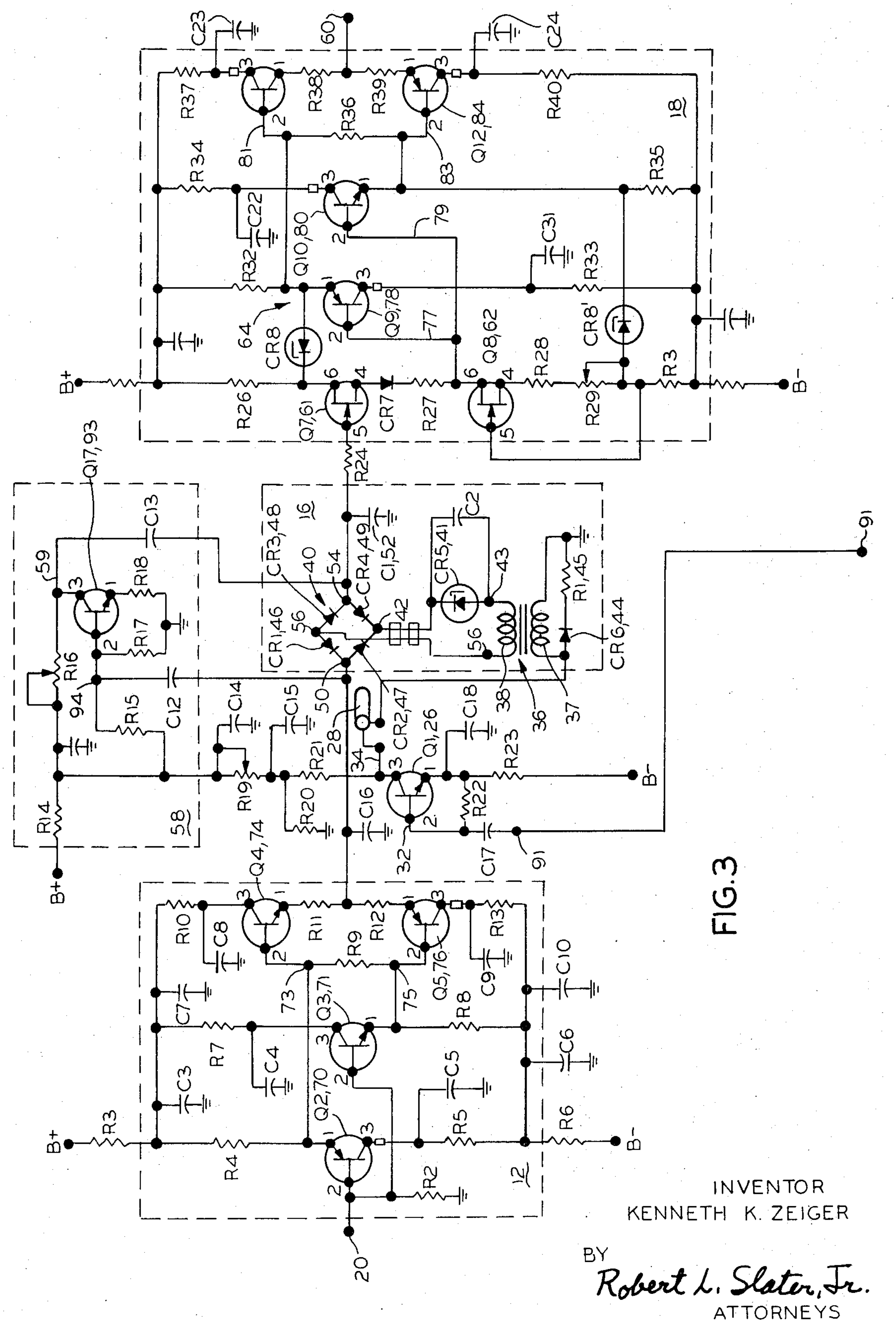
FIG. 3 is an electrical schematic of the sample and hold circuit except for the non-saturating switch means. DESCRIPTION OF THE PREFERRED EMBODIMENT Referring now to the several figures of the drawings, the reference numeral 10 indicates generally a sample and hold circuit suitable for use with an analog-to-digital converter. The sample and hold circuit 10 comprises an input amplifier 12, a trigger means 14, a switch means 16 and an output amplifier 18.

The input amplifier 12 includes a balanced common collector amplifier 19 to provide a low output impedance and isolation of the input analog signal appearing at the analog input point 20 from the remainder of the circuit 10 (FIG. 3).

Figure 1:
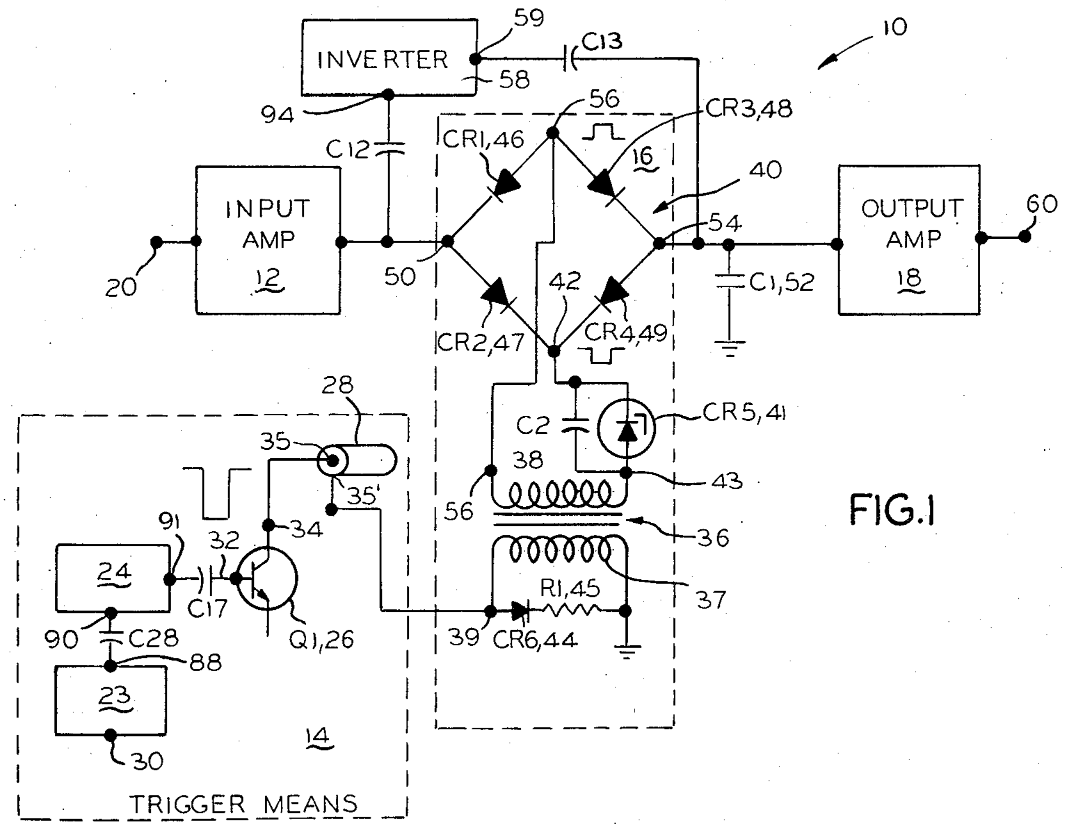
FIG. 1 is a schematic of the switch means and a block diagram of the remainder of the sample and hold circuit, embodying the principles of the invention.

The trigger means 14 includes two non-saturating switches 23 and 24 time. 2) and a transistor Q1,26 for operating in the avalanche mode (FIGS. 1 and 3). The transistor 26 is turned "on" by drive pulses generated by switches 23 and 24 and turned "off" by reflected energy generated along a coaxial delay line 28. The amplitude of the input pulse at input point 30 is stabilized by the switches 23 and 24. The stabilized output pulse from switches 23 and 24 at point 32 drives the transistor 26 into the avalanche mode (FIGS. 1 and 3). The transistor 26 generates a negative trigger pulse with respect to the common line (or ground) at output point 34, having an extremely fast rise time and fall time The trigger pulses do not have any appreciable jitter or pulse width variation from one pulse to another.

The delay line 28 is connected to the output 34 of transistor 26. The delay line is an unterminated coaxial cable having a center conductor 35 and a metallic outer sheath 35' encircling and spaced from the conductor 35. Since the reflected energy of the delay line turns "off" the avalanche transistor 26, the length of the delay line primarily determines the pulse width of the trigger pulse at the output 34.

The switch means 16 includes a wide band transformer 36 having a primary side 37 and a secondary side 38. The end 39 of the primary 37 is connected to the sheath 35' of the delay line 28, and thereby capacitively couples the delay line 28 with the transformer 36. A zener diode 41 is connected between a point 42 of the bridge and point 43 of the transformer secondary 38. A diode CR6,44 in series with resistor R1,45 are connected across transformer primary 37. Diode 44 passes the positive signal to the common line, so that transformer 36 couples only the negative signals to the bridge 40.

Bridge 40 comprises diodes CR1,46, CR2,47, CR3,48 and CR4,49 (FIGS. 1 and 3). The input analog signal to the bridge 40 is impressed at the bridge input point 50, which is the output point for the common collector amplifier 19 of the input means 12. A hold capacitor C1,52 is connected between the bridge output point 54 and the circuit common line. As shown, the cathode of diode CR1 and the anode of diode CR2 are connected together at bridge input 50; and the cathode of diode CR3 and the anode of diode CR4 are connected together at bridge output 54. The anodes of diodes CR1 and CR3 are connected together at point 56; and the cathodes of diodes CR2 and CR4 are connected together at the point 42.

The bridge 40 in cooperation with the zener diode 41, block passage of the analog voltage until breakover of the zener diode 41. When the trigger pulse is produced at the output 34 of the transistor 26, a positive trigger pulse is impressed across the secondary 38 of transformer 36 between points 56 and 43, which forward biases the diode bridge 40 and enables current to flow through zener diode 41. The hold capacitor C1,52 now charges to the value of the analog voltage, which is simultaneously present at bridge input 40. This may be accomplished by either charging or discharging the hold capacitor C1,52 and therefore the current may flow in either direction through bridge 40.

The diode bridge 40 and zener diode 41 are biased "off" on the trailing edge of the trigger pulse. Since the voltage across the zener diode is less than the zener voltage except when a trigger pulse is present, the bridge remains "off" until the next pulse.

An inverter means 58 inverts the signal variations occurring at the bridge input point 50. The inverted signals appearing at the output 59 of the inverter 58 cancel the signals that couple through the bridge from the input 50 to the output 54 via the bridge capacitance when the bridge is biased "off."

The output amplifier 18 has a high input impedance and transfers the hold voltage at point 54 to the low impedance output point 60. A field effect transistor (FET) source follower 61 provides the high input impedance. The current through the source follower is determined by another matched FET 62. A common collector amplifier means 64 is connected between the source follower 61 and the output 60. Output voltages from the amplifier means 64 are coupled back to the two input FET amplifiers to hold the gate to drain voltage across the FETS 61 and 62 nearly constant.

The input amplifier 12 (FIG. 3) includes a PNP input transistor Q2,70 and an NPN input transistor Q3,71, having their base junctions 2 connected to the analog input point 20 and resistor R2. The collector 3 of Q2 is connected to resistor R5 and to a by-pass capacitor C5; and the collector 3 of Q3 is connected to resistor R7 and a by-pass capacitor C4. Emitter 1 of Q2 is connected to resistors R4 and R9 and input point 73 to the base 2 of NPN transistor Q4,74; and emitter 1 of Q3 is connected to resistor R8 and to the opposite end of resistor R9 and to input point 75 to the base 1 of PNP transistor Q5,76.

The collector 3 of transistor Q4 is connected to resistor R10 and by-pass capacitor C8; and collector 3 of Q5 is connected to resistor R13 and by-pass capacitor C9. The emitter of Q4 is connected to resistor R11; and the emitter of Q5 is connected to resistor R12. The opposite ends of R11 and R12 are tied together and connected to the input 50 of bridge 40. A capacitor C16 is tied between point 50 and ground.

The negative signals are amplified by the emitter follower Q2 and the positive signals are amplified by emitter follower Q3. Q2 and Q3 may also be referred to as a balanced common collector amplifier Q4 and Q5 function as a common collector complementary symmetry circuit to provide a low output impedance.

The output amplifier 18 comprises the FET source follower Q7,61 and matched FET Q8,62 connected in the source circuit for FET 61. The gate 5 of FET 61 receives the hold voltage from the hold capacitor C1,52 via resistor R24. The source 4 is connected to the anode of diode CR7; and the drain 6 is connected to resistor R26 and to the cathode side of zener diode CR8. The drain 6 of FET Q8,62 is connected to the cathode of diode CR7 via resistor R27 and to the input 77 to the base 2 junction of PNP transistor Q9,78 and input 79 to the base 2 junction of NPN transistor Q10, 80 ; the source 4 of Q8 is connected to resistor R28, which in turn, is connected to one side of variable resistor R29; and the gate 5 is connected to the junction of resistor R30, the variable arm of resistor R29 and the anode side of zener diode CR8.

The collector 3 of Q9,78 is connected to resistor R33 and capacitor C31; and the collector 3 of Q10,80 is connected to resistor R34 and capacitor C22. The emitter of Q9,78 is connected to resistors R32 and R36, the anode side of zener diode CR8, and to the input 81 to base 2 of NPN transistor Q11,82. The emitter of Q10,80 is connected to resistors R35 and the opposite end of R36, the cathode side of zener diode CR8', and to the input 83 to the base 2 of PNP transistor Q12,84.

The collector 3 of Q11,82 is connected to resistor R37 and capacitor C23; and the collector 3 of Q12,84 is connected to resistor R40 and capacitor C24. The emitter 1 of Q11 is connected to resistor R38 and emitter 1 of Q12 is connected to resistor R39. The output 60 of the output amplifier means 18 is connected to the junction of the resistors R38 and R39.

The voltage value on the storage capacitor C1,52 is amplified by the FET source follower Q7,61. The voltage from the source follower is directly connected to the common collector amplifier means 64 which is a balanced PNP, NPN (Q9 and Q10) circuit. The amplifier means 64 provides a low output impedance and a high input impedance to the source follower. The output voltages at points 81 and 82 are connected to the output stage and also coupled back to the two input FET transistors Q7 and Q8 through the zener diodes CR8' and CR8, so that the gate to drain voltage across the FET's is nearly constant. In this manner, linear operation over a wide range of voltage swings may be obtained without serious thermal effects.

Figure 2:
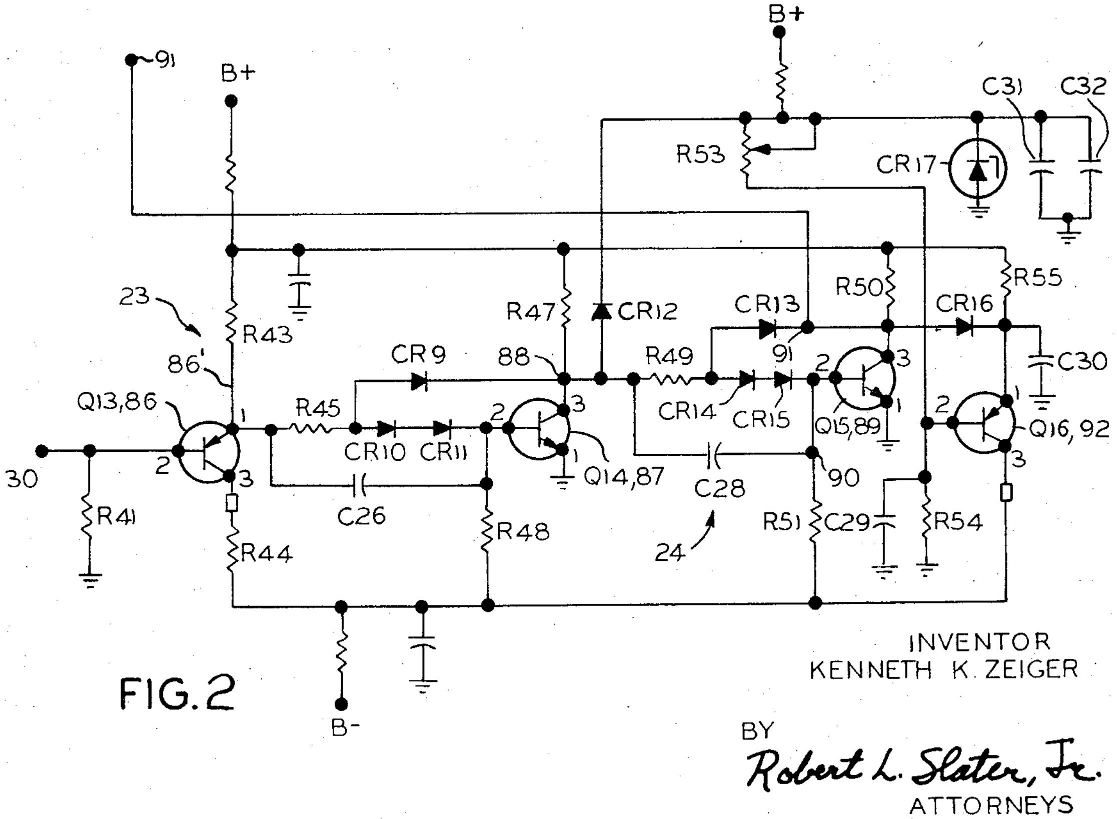
FIG. 2 is an electrical schematic of the non-saturating switch means of the trigger means.

Turning now specifically to FIG. 2, the switches 23 and 24 will be described with greater detail. Switch 23 comprises input PNP transistor Q13,86 having a base 2, connected to the input point 30 and a resistor R41; a collector 3 connected to resistor R44; and an emitter 1 or output point 86' connected to resistors R43 and R45 and to the base 2 of NPN transistor Q14,87 via capacitor C26. Diode CR11 is series connected on the anode side with the cathode side of diode CR10; and connected on the cathode side to the base 2 of Q14, resistor R48 and capacitor C26. Diode CR9 is connected on the anode side to the junction of the anode of CR10 and resistor R45; and on the cathode side to the collector 3 of transistor Q14 which is also output point 88.

The emitter 1 of transistor Q14,87 is connected to the common line; and collector 3 is connected to resistors R47 and R49, the anode of diode CR12, and to the base 1 of transistor Q15,89 via capacitor C28 which is input point 90 to switch 24. The cathode side of diode CR12 is connected to a fixed voltage source determined by zener diode CR17. Capacitors C31 and 32 are tied across CR17.

The base of transistor Q15,89 is connected to resistor R51, capacitor C28 and the cathode of diode CR15; the emitter 1 connected to the common line; and collector 3 or output point 91 is connected to resistor R50, diodes CR13 and CR16 and to the input of transistor Q1,26 via capacitor C17 (FIGS. 1 and 3). The anode side of CR15 is series connected with the cathode side of diode CR14. Diode CR13 is connected on the anode side to the junction of the anode of diode CR14 and resistor R49.

The cathode side of diode CR16 is connected to the junction of emitter 1 of transistor Q16,92, capacitor C30 and resistor R55; and the base 2 of Q16 is connected to the junction of variable resistor R53 and resistor R54 and by-pass capacitor C29.

Transistor Q1,26 (FIG. 3) includes a base 2, which is input 32, connected to resistor R22 and capacitor C17; an emitter 1 connected to the junction of resistors R22 and R23 and capacitor C18; and a collector 3, which is output point 34, connected to the center conductor 35 of the delay line 28 and resistor R21. The opposite end of R21 is connected to the junction of resistors R20 and R19 and capacitor C15. Q1 may be a mesa transistor such as a 2N797, and the delay line 28 may be a length of RC188 coaxial cable.

Diodes CR9, CR10 and CR11 of switch 23 are of the same type, and prevent transistor Q14 from saturating, when the incoming pulse tends to pull the collector toward the base 2 voltage. Thus, the voltage drop across CR10 and CR11 maintains the collector more positive than the base. The collector 3 of Q14 is also limited in the positive direction and can't exceed the zener voltage of zener diode CR17.

Similarly, diodes CR13, CR14 and CR15 of switch 24 are of the same type and prevent transistor Q15 from saturating. Also, the collector 3 is limited in the positive direction. This is due to the stiff base emitter 1 voltage of PNP transistor Q16 due to the voltage divider of resistors R53 and 54 at the base 2. The emitter voltage of Q16 may be varied by adjusting variable resistor R53.

The inverter means 59 comprises an NPN transistor Q17,93 having an emitter 1 connected to resistor R18; a base 2 connected to resistors R17 and R15, input point 94 and capacitors C12; and a collector 3 connected to resistor R16, and a capacitor C13; and output point 59. Capacitor C12 is connected to bridge input 50 and capacitor C13 is connected to bridge output 54. The other end of R15 is connected to resistor R19. The signal at input 94 is inverted through the unity gain amplifier of Q17.

The aperture time determines the maximum input frequency that can be sampled to a prescribed accuracy. The jitter from pulse to pulse and the speed with which the diodes are turned off determine the aperture time of the sample and hold circuit 10. The frequency, aperture time and accuracy relationships are developed as follows:

The input waveform voltage equation is $E = E_m$ Sinwt. Differentiating this equation provides the rate of change of the input signal: $dE = E_M w$Coswtdt. This equation is maximum when cosine of wt equals 1. Under the maximum condition $dE = E_M$ wdt and $dE/E_M$ = wdt. $dE/E_M$ is the accuracy to which the waveform is to be sampled; $w$ is the maximum input frequency in radians per second and $dt$ is the required aperture time. Thus, to sample rapidly changing waveforms to high accuracy, the speed and jitter in the pulse waveform must be maximized. In the subject circuit, for a 5 volt input with a rise time of 10 nanoseconds or less, the aperture time is less than 100 picoseconds ($10^{-10}$ seconds).

The input waveform signal to be sampled is impressed at the input point 20 of the input amplifier 12. The signal is amplified by the balanced PNP and NPN common collector amplifier of transistors Q2 and Q3 and the common collector symmetry circuit of NPN and PNP transistors Q4 and Q5, to provide a low output impedance at the input point 50 to bridge 40. The bridge is normally "off" and prevented from conducting by the zener diodes CR5,41, which must have a zener voltage greater than the waveform voltage at input 50. Although the illustrative embodiment shows 1 zener diode, 2 zener diodes may be used to achieve better balance, and each would have one-half of the zener voltage as compared with the single zener diode arrangement.

The trigger means 14 must provide a signal having a fast rise and fall time and must not introduce jitter or have measurable pulse width variation from one pulse to another. This is accomplished by using two non-saturating switches 23,24 comprising the NPN transistors Q14,Q15 to drive the mesa transistor Q1,26 in the avalanche mode. The avalanche transistor Q1 has a very sharp threshold point and provides a trigger pulse having a sharp rise and fall time at the output point 34.

The trigger pulse is capacitively coupled from the delay line 28 to the primary 37 of the wide band transformer 36. The width of the trigger pulse is determined by the length of the delay line 28. The leading edge of the pulse transferred through the transformer forward biases the bridge and overcomes the zener voltage of the zener diode 41. The hold capacitor C1,52 now charges to the value of the waveform voltage instantaneously appearing at the input point 50. The time that the bridge diodes are "on" is determined by the length of the delay line 28. When the reflected energy along the delay line turns "off" the avalanche transistor Q1,26, the trailing edge of the trigger pulse generated at that instant also turns "off" the bridge 40, and the zener diode 41. The bridge is maintained "off" by the zener voltage of the zener diodes, and the voltage on the hold capacitor C1,52 is held until the next sample period.

The voltage value in the storage capacitor is amplified by the FET source follower 61 which presents a high input impedance. The balanced common collector amplifier comprising the PNP and NPN transistors of Q9 and Q10 also present a high input impedance to the source follower.

The foregoing specification and description are intended as illustrative of the invention, the scope of which is defined in the following claims.

I claim:

1. In a circuit for sampling and holding a voltage of a waveform signal including an input means for receiving said signal, sampling means for sampling a portion of said signal, a storage capacitor means for storing a voltage corresponding to the voltage of said portion of the signal, and an output means for connecting said stored portion of the signal to an output point, said sampling means comprising:

a bridge having a first, second, third and fourth substantially unidirectional conductive devices, each of said devices having an anode and a cathode, the cathode side of the first device being connected to the anode side of the second device at a first terminal and the cathode side of the third device being connected to anode side of the fourth device at a second terminal, the anode sides of the first and third devices being connected together at a first point and the cathode sides of the second and fourth devices being connected together at a second point, said input means being connected to said first terminal and said storage capacitor being connected to said second terminal;

a zener diode interposed between said points of the bridge;

a transistor means having an input and an output, said input receiving a drive pulse to turn "on" the transistor means for generating a trigger pulse;

a transformer means having a primary side coupled to the output of said transistor means, and a secondary side coupled to said switch means, said transformer means coupling said trigger pulse from the output to said switch means to forward bias said bridge and cause conduction through said zener diode, and an unterminated delay line having a center conductor connected to the output of the transistor means, the primary of said transformer means being coupled to said center conductor, energy reflected along said delay line turning "off" said transistor means.

2. The circuit of claim 1 includes a signal inverter means having an input and an output, the input of the inverter being coupled to the input of the bridge to receive voltage variations of said signal, the output of the inverter providing signals to cancel leakage signals coupling through the bridge via capacitance between the input and output of the bridge.

3. The circuit of claim 1, wherein said delay line includes an electrical conductive sheath encircling said center conductor, said primary of the transformer means being connected to said sheath to capacitively couple with said center conductor.

4. The circuit of claim 3, wherein said transistor means comprises a mesa transistor, said drive pulse driving the mesa transistor into avalanche mode.

5. The circuit of claim 4, wherein amplifier means is coupled to said transistor means for generating said drive pulse, said amplifier means including at least one non-saturating amplifier.

6. The circuit of claim 5, wherein said non-saturating amplifier means includes a second transistor having a collector, emitter and base terminals;

means connected to the base terminal and one of the other of said second transistor terminals to prevent the second transistor from saturating; and means connected to said other terminal to prevent the voltage between said other terminal from exceeding a predetermined level.

7. The circuit of claim 6, wherein:

a first diode member is coupled on one end to the collector; and a second diode and a third diode are connected in series, said third diode being connected to the base and said second diode being connected to the opposite end of the first diode, said diode members preventing the voltage between the collector and base of the second transistor from falling below a predetermined level.

8. The circuit of claim 7, wherein a zener diode is associated with the collector terminal to prevent the voltage at the collector terminal from exceeding said predetermined level.

9. the circuit of claim 7, wherein a substantially constant voltage source is coupled to the collector whereby current conducts between the collector and the voltage source to prevent the voltage between collector and base from exceeding said predetermined level.

10. The circuit of claim 6, wherein a field effect transistor ("FET") source follower means is connected to the storage capacitor, said source follower providing a high input impedance to the storage capacitor.

11. The circuit of claim 10, wherein a common collector amplifier means is connected to said source follower to provide a high input impedance to the source follower and a low output impedance, said common collector amplifier including a balanced PNP and NPN circuit.

12. The circuit of claim 10, wherein a second field effect transistor is connected in the source circuit of the source follower to control current flow through the source follower.

13. The circuit of claim 6, wherein a balanced common collector amplifier is coupled to the input of the bridge to provide a low output impedance to the bridge.

14. In a circuit for sampling and holding a voltage of a waveform signal including an input means for receiving said signal, sampling means for sampling a portion of said signal, a storage capacitor means for storing a voltage corresponding to the voltage of said portion of the signal, and an output means for connecting said stored portion of the signal to an output point, said sampling means comprising:

a switch means including an input end connected to the output of said input means and an output end connected to said storage capacitor means, said switch means having an on-condition and an off-condition, said switch means permitting current flow between the input means and the storage capacitor to enable said capacitor to charge substantially to the voltage level simultaneously appearing at said input end, and a trigger means for switching said switch means to the on-condition for a predetermined time duration and switching said switch means to the off-condition after said duration, including an unterminated delay line receiving an input signal when the switch means is switched to its on-condition and delivering a delayed reflected signal for switching said switch means to its off-condition.

15. The circuit of claim 14 includes a signal inverter means having an input and an output, the input of the inverter being coupled to the input of the bridge to receive voltage variations of said signal, the output of the inverter providing signals to cancel leakage signals coupling through the bridge via capacitance between the input and output of the bridge.

16. The sample and hold circuit of claim 14, wherein said switch means includes:

a bridge having a first, second, third and fourth substantially unidirectional conductive devices, each of said devices having an anode and a cathode, the cathode side of the first device being connected to the anode side of the second device at a first terminal and the cathode side of the third device being connected to the anode side of the fourth device at a second terminal, the anode sides of the first and third devices being connected together at a first point and the cathode sides of the second and fourth devices being connected together at a second point, said input means being connected to said first terminal and said storage capacitor being connected to said second terminal; and a switch member interposed between said bridge and said trigger means, said switch member having an on-condition and an off-condition, said switch member enabling current flow through said bridge when in the on-condition, said trigger means causing said switch member to switch the on-condition.

17. The circuit of claim 16, wherein said switch member comprises a zener diode having one end connected to one of said points, the zener voltage of said zener diode being greater than the voltage of the analog signal appearing at said first terminal.

18. The circuit of claim 17, wherein said trigger means includes means for providing a trigger pulse having a voltage on the leading edge greater than the zener voltage, said trigger pulse forward biasing the bridge and overcoming said zener voltage to enable current conduction through the bridge and said zener diode, the trailing edge of said trigger pulse causing said bridge and zener diode to bias "off" and thereby preventing current flow through the bridge.

19. The circuit of claim 18, wherein said trigger means includes:

a transistor means having an input and an output, said input receiving a drive pulse to turn "on" the transistor means for generating said trigger pulse; and a transformer means having a primary side coupled to the output of said transistor means, and a second side coupled to said switch means, said transformer means coupling said trigger pulse from the output to said switch means to forward bias said bridge and cause conduction through said zener diode.

20. The circuit of claim 19, wherein said trigger means further includes an unterminated delay line having a center conductor connected to the output of the transistor means, the primary of said transformer means being coupled to said center conductor, energy reflected along said delay line turning "off" said transistor means.

21. The circuit of claim 20, wherein said delay line includes an electrical conductive sheath encircling said center conductor, said primary of the transformer means being connected to said sheath to capacitively couple with said center conductor.

22. The circuit of claim 20, wherein said transistor means comprises a mesa transistor, said drive pulse driving the mesa transistor into avalanche mode.

23. In a method for sampling and holding an analog signal including the steps of:

connecting an analog signal to the input of a diode bridge means:

applying a turn "on" voltage greater than the zener voltage of a zener diode means connected in the current pathway of said bridge, to cause conduction between said input of the bridge and a storage capacitor for charging the storage capacitor to the voltage level of the analog signal simultaneously appearing at said input, said zener voltage being greater than the voltage of said analog signal;

applying a turn "off" voltage to bias said bridge and zener diode "off" whereby said zener voltage maintains the bridge "off" until said turn "on" voltage is again applied, and delivering the turn "on" voltage to the input of an unterminated delay line and deriving a reflected signal from said delay line with a predetermined delay for providing the turn "off" voltage for said bridge.

* * * * *